United States Patent [19]
Butler et al.

[11] Patent Number: 5,571,598
[45] Date of Patent: Nov. 5, 1996

[54] DECORATIVE LIGHT TRANSMITTING PANEL AND METHOD FOR ITS FABRICATION

[76] Inventors: Delicia M. Butler, 31089 Old River Rd., Bonsall, Calif. 92003; Stefan Kanetis, 5722 E. Stillwater, No. 38, Orange, Calif. 92669

[21] Appl. No.: 394,738

[22] Filed: Feb. 27, 1995

[51] Int. Cl.⁶ .......................... A47G 35/00; C03B 21/00
[52] U.S. Cl. .......................... 428/156; 428/167; 428/141; 428/148; 428/172; 428/174; 428/213; 428/908.8; 264/167; 264/299; 264/319
[58] Field of Search .................... 428/156, 172, 428/34, 174, 167, 141, 148, 213, 208, 908.8; 156/99, 107, 109; 264/167, 299, 319

[56] References Cited

U.S. PATENT DOCUMENTS

| | | | |
|---|---|---|---|
| 5,118,543 | 6/1992 | McColl | 428/34 |
| 5,204,160 | 4/1993 | Rouser | 428/167 |
| 5,352,532 | 10/1994 | Kline | 428/34 |

*Primary Examiner*—Donald Loney
*Attorney, Agent, or Firm*—Plante & Strauss

[57] ABSTRACT

There is disclosed a light-transmitting panel of thermoplastic sheet material which has a relief pattern defined by a plurality of generally co-planar segments which are separated by deep surface relieved areas that are characterized by greater material thickness than the planar segments and smoothly arched surfaces of greater optical quality than the planar segments. The invention also comprises a method for forming the decorative light-transmitting panel by thermoforming a plastic sheet on a mold having a plurality of generally co-planer lands which are separated by deep recesses that receive sagged regions of the thermoplastic sheet material. The sheet material which has been heated to its softening temperature is compressed against the lands to extrude the plastic material into the recess areas, following by cooling and removing the sheet from the mold to obtain the light-transmitting panel.

12 Claims, 3 Drawing Sheets

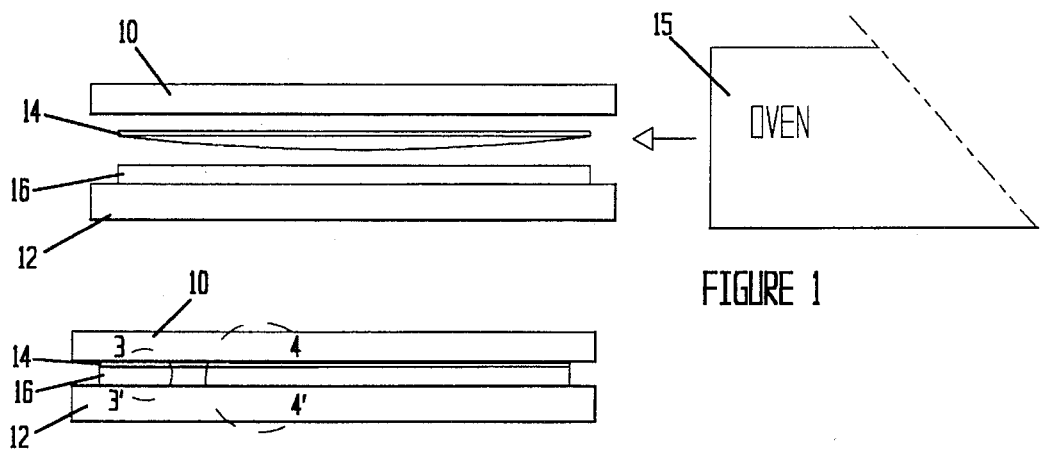
FIGURE 1
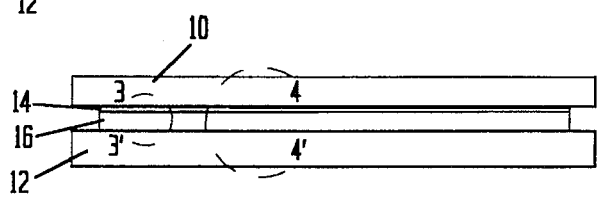
FIGURE 2
FIGURE 3
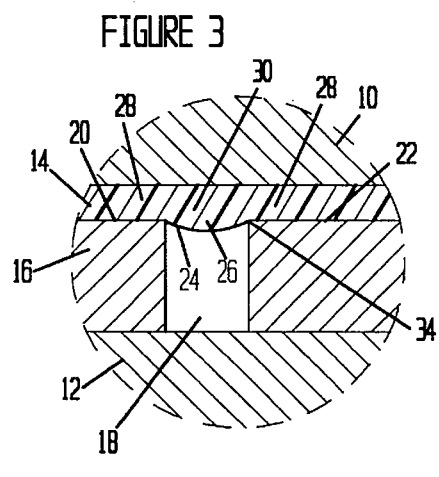
FIGURE 4
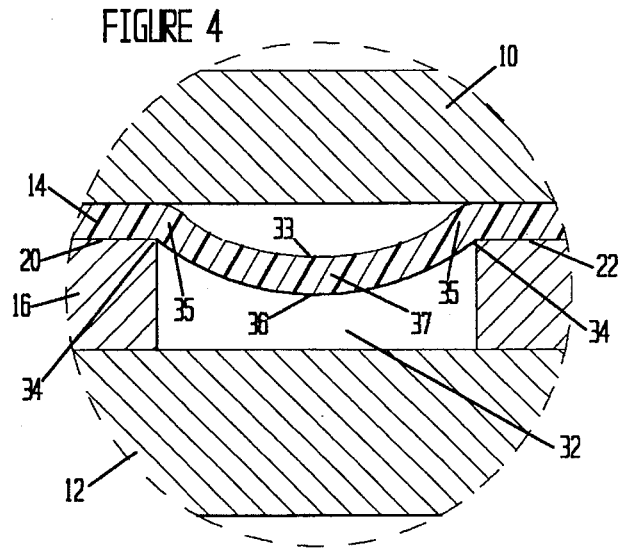

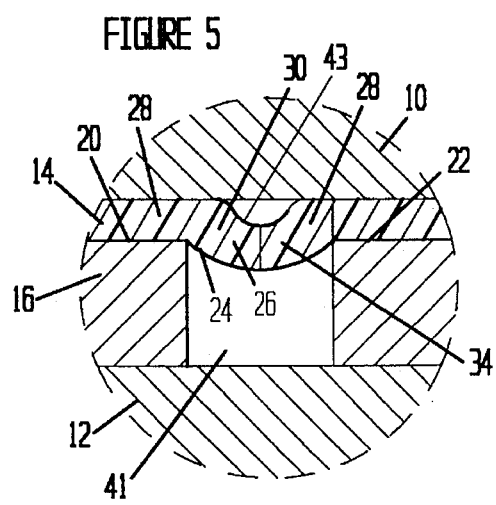
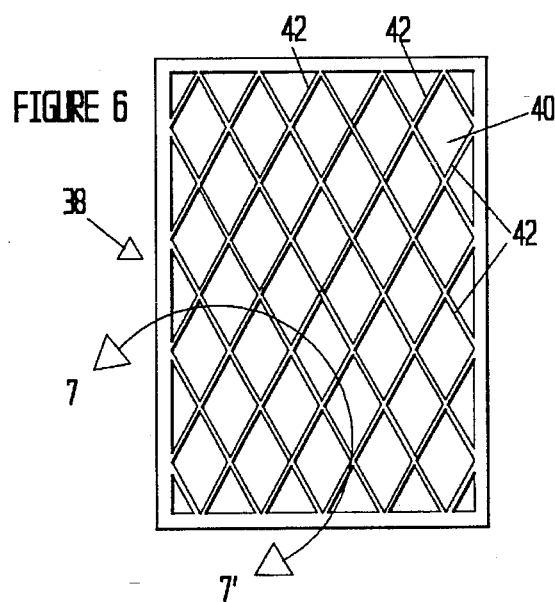
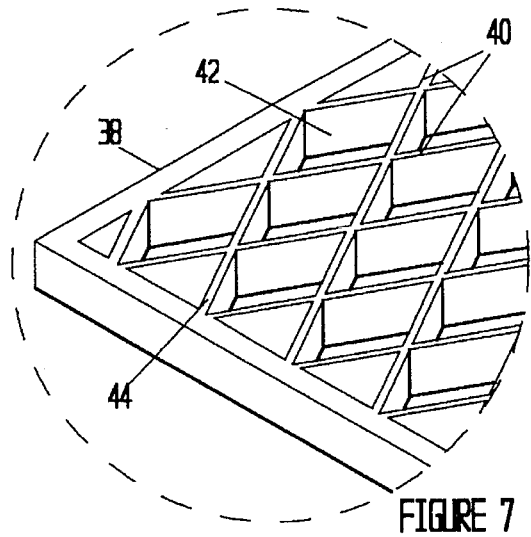
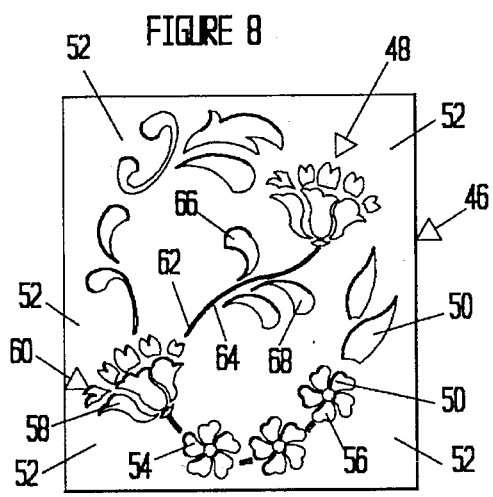

5,571,598

DECORATIVE LIGHT TRANSMITTING PANEL AND METHOD FOR ITS FABRICATION

BACKGROUND OF THE INVENTION

1. Field of the Invention

This invention relates to a light transmitting panel having remarkable artistic relief patterns and to a method for its fabrication.

2. Brief Statement of the Prior Art

Decorative panels of glass or light-transmitting plastics have been used in many and varied application. A classic example is the ancient technique of stained and leaded glass in which colored segments of glass are secured with lead caming into an artistic panel. In recent years plastic overlays and lead strip caming have been used such as exemplified by U.S. Pat. No. 4,335,170 and 4,438,165.

Beveled and leaded glass has also been used for centuries in which the edges of segments of glass are beveled and the segments are secured together by lead caming. The refraction and reflection of light by the beveled edges of the glass enhances the over-all artistic appearance of these panels. In U.S. Pat. No. 4,488,919 there is disclosed and claimed a method for simulating the beveled and leaded glass utilizing plastic sheets in which beveled grooves have been formed by molded or machining. Lead caming is placed in the grooves to complete the overall appearance flat panels of beveled and leaded glass. While this technique simulates beveled and leaded glass, it, as beveled glass, has a limited degree of refraction and reflection of light because of the limited thickness of the material used for the panel.

None of the techniques achieves the full potential of light reflection that can be attained with a deeply relieved artistic pattern in transparent or light-transmitting panels.

OBJECTIVES OF THE INVENTION

It is an objective of this invention to provide a light-transmitting panel of remarkable and heretofore unachieved light refraction and reflection.

It is an additional objective to provide a simple and direct method for the fabrication of a light-transmitting panel from thermoplastic sheet material.

It is a further objective of this invention to provide a method for virtually unlimited artistic expression of relief patterns in a light-transmitting panel.

It is yet another objective to provide a light transmitting panel having light refraction and reflection properties surpassing those of the finest bevel and leaded glass.

Other and related objectives will be apparent from the following description of the invention.

BRIEF STATEMENT OF THE INVENTION

This invention comprises a light-transmitting panel of thermoplastic sheet material which has a relief pattern defined by a plurality of generally co-planar segments which are separated by deep surface relieved areas that are characterized by greater material thickness than the planar segments and smoothly arched surfaces of greater optical quality than the planar segments. The invention also comprises a method for forming the decorative light-transmitting panel by thermoforming a plastic sheet on a mold having a plurality of generally co-planer lands which are separated by deep recesses that receive sagged regions of the thermoplastic sheet material. The sheet material which has been heated to its softening temperature is compressed against the lands to extrude the plastic material into the recess areas, following by cooling and removing the sheet from the mold to obtain the light-transmitting panel.

BRIEF DESCRIPTION OF THE DRAWINGS

The invention will be described with reference to the figures of which;

FIG. 1 illustrates a heated plastic sheet above the mold used in the method of the invention;

FIG. 2 illustrates the step of molding the heated plastic sheet in the invention;

FIG. 3 is an enlarged view of the area within line 3—3' of FIG. 2;

FIG. 4 is an enlarged view of the area within line 4—4' of FIG. 2;

FIG. 5 is an enlarged view of an area within a mold having a mold cavity with a size intermediate those shown in FIGS. 3 and 4;

FIG. 6 is a planar view of a mold useful in the invention;

FIG. 7 is a perspective view of the portion of the mold shown in the area within line 7—7' of FIG. 6;

FIG. 8 is a planar view of another mold useful in the invention;

DESCRIPTION OF THE PREFERRED EMBODIMENT

Figure 9:
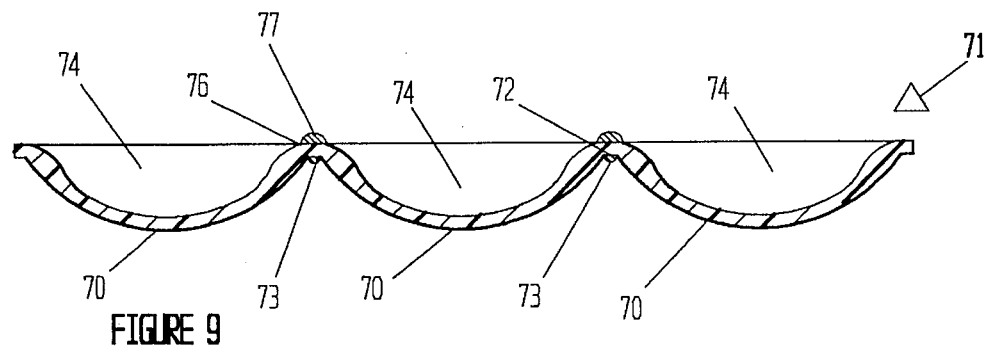
FIG. 9 is a sectional view of a portion of a light-transmitting panel of the invention prepared by the mold of FIGS. 6 and 7.

Referring to FIG. 1, the method of the invention is illustrated with a press actuated by pneumatic or hydraulic pressure and having an upper platen 10 and a lower platen 12. The platens are movable towards and away from each other to permit compression of a thermoplastic sheet 14 against the mold 16 of the invention which rests on the lower platen 12. The thermoplastic sheet 14 is heated above its softening temperature and, as shown in FIG. 1, thermally sags under its own weight when placed in the mold.

FIG. 2 illustrates the platens 10 and 12 of the press closed to exert compressive forces against the thermoplastic sheet 14, compressing it against the mold 16 of the invention.

Referring now to FIG. 3, there is illustrated a cross sectional view of a portion of the mold in which a recess 18 is shown between adjacent lands 20 and 22 which are generally co-planer. As illustrated, the recess 18 is quite deep and offers no support to the undersurface 24 of the thermoplastic sheet 14 which sags into a smoothly contoured protrusion 26 within the recess 18. The high compressive loading of the press causes extrusion of some of the thermoplastic resin from the area 28 above the lands 20 and 22 and into the region 30 above the recess 18, thereby increasing the thickness of the protrusion 26 formed in the thermoplastic sheet 14 in the recesses 18 of the mold 16. The greater thickness of the plastic sheet material in the resulting, smoothly contoured relief pattern caused by the thermo-sagging of the resin contributes to varied refraction and reflection characteristics of the resulting panel.

Referring now to FIG. 4, there is illustrated another portion of the mold of the invention. As shown in FIG. 4, the recess 32 spans a greater area than the recess 18 illustrated in FIG. 3 such that the plastic sheet 14 in the area above recess 32 undergoes sagging, resulting in a concavity 33 in the upper surface and a convex protrusion 37 in the undersurface of the plastic sheet 14. Additionally, extrusion of the thermoplastic resin from the areas above the lands 20 and 22 of the mold 16 results in a greater thickness 35 in the contoured recessed areas.

Although the mold 16 is shown both in FIGS. 3 and 4 as having relatively sharp shoulders 34 between the recesses such as 18 and 34 and the adjacent lands 20 and 22, the sharp edges of shoulders 34 are not reproduced in the thermoplastic sheet panel. Instead, the panel is formed with a very smoothly contoured undersurfaces of the protrusions 26 and 36 in the recesses 18 and 32.

Referring now to FIG. 5, there is illustrated a sectional view through a mold 16 and thermoplastic sheet 4. The cavity 41 of the mold 16 is of a size intermediate those of cavity 18, shown in FIG. 3 and cavity 32, shown in FIG. 4. The thermoplastic sheet 14 sags in cavity 41 resulting in a small concavity 43 in the top surface of the sheet 14 and a protrusion 45 which is less than protrusion 6 shown in FIG. 4, but greater than protrusion 26 shown in FIG. 3. The thickness of the sheet is increased at regions 30, from extrusion of resin into those regions.

The shape of the protrusions such as 26, 36 and 45 is controlled by the extent of the thermal sagging of the plastic sheet 14 in the mold recesses and the degree of extrusion of resin. The thermal sagging is responsive to the temperature of the molding, and the extrusion is responsive to the temperature and pressure of the molding step.

The temperature of the molding step is controlled by the temperature of oven 15, and the resident time of the thermoplastic sheet in the oven. The temperature, of course, is above the softening temperature for the thermoplastic. Typically, temperatures from about 225° F. to 375° F. can be used for thermoplastics such as acrylics (polymethylmethacrylate) and polycarbonates. The precise temperature which is selected will depend on the thermoplastic being formed. The pressure applied during the molding can be from about 500 pounds per square inch (psi) to about 3000 psi. The variations in thickness of the material in the protrusions formed in the sheet provide great visual effects, as those variations result in substantial changes in the refraction and transmission of light through the light-transmitting panel. In this manner, substantial variations in light-transmitting panels can be produced from the same mold, which greatly increases the versatility of the method in production of artistic affects.

Most thermoplastic products are annealed after treatments such as machining or forming to reduce the tendencies of the plastic to craze or crack. The annealing step is usually a heat treatment at a temperature from 150° F. to about 200° F. in an oven for a period from about 3 to 10 hours, followed by slow cooling of the product at a cooling rate from about 15° F. to 25° F. per hour. If desired, the annealing can be applied to the molded light-transmitting panels of this invention. The method of this invention, however, has been observed to produce stable products without crazing or cracking when the annealing step has not been used, and use of the annealing step remains an optional treatment.

Referring now to FIG. 6, there is illustrated a planar view of a suitable mold 38 used in the invention. The mold 38 is formed of metal, e.g., aluminum, stainless steel, mild steel, etc. The mold 38 is provided with a plurality of generally co-planer, criss-crossing lands 40 in the form of ribs which are separated by deep recesses 42 of a diamond shape. This construction detail is better shown in FIG. 7 which is a perspective view of the portion of the mold 38 within line 7—7' of FIG. 6.

From FIG. 7, it can be seen that the recesses 42 which permit thermal sagging of the plastic sheet extend through the thickness of the mold 38, i.e., are open to each side of mold 38. This insures that the highly polished surface of the thermoplastic sheet is not impaired by contacting with a metal mold surface, but, instead the plastic sheet material which sags into the recesses remains out of contact with any mold surface and thus retains its original finish. Thus, when using plastic sheets of optical quality, the areas of the contoured relief of the finished product remain of optical quality. The open recesses also ensure that each of the relieved areas are smoothly contoured with curvatures that are dictated by the thermal sagging and extrusion of the thermoplastic sheet and the shape of the protrusion can thus be readily controlled by control of the temperature of the plastic sheet and/or the pressure applied to the thermoplastic sheet during the molding step.

Another advantage of the through recesses in the mold is that the molds can be reversed side-to-side to prepare panels which have mirrored artistic images molded into their surfaces. This advantage is particularly useful for molds with non-symmetrical patterns, such as illustrated in FIG. 8.

Desirable, the surfaces 44 of the lands 40 are provided with surface relief patterns achieved by techniques such as acid etching, grinding, or by cutting grooves with conventional machining techniques including EDM (electron discharge machining), or laser radiation. This will impart a surface texture to the thermoplastic sheet material which is compressed against the lands. This is desirable since it is extremely difficult and costly to impart optical surface finishing to the land areas and, accordingly, the plastic sheet material which is contacted by the land areas will otherwise exhibit a substantially decreased optical quality.

FIG. 9 is a sectional view through a portion of a light-transmitting panel 71 which is produced with the mold 38 shown in FIGS. 6 and 7. As shown in FIG. 9, panel 71 has, on one side, smoothly contoured, convex, protrusions 70 which have a diamond shape as they are formed in the recesses 42 of the mold 38, with a criss-crossing pattern of coplanar grooves 72 which are formed by the lands 40 of mold 38. The opposite side of the light-transmitting panel, has smoothly contoured, cavities 74, which are separated by a flat pattern of criss-crossing, coplanar ribs 76. If desired, lead caming 73 can be applied in the grooves 72 and lead caming 77 can be applied to the ribs 76. For this purpose, strips of lead having a layer of permanent, pressure sensitive adhesive on their undersurfaces are applied to the grooves 72 or ribs 76 of the panel, completely the appearance of leaded glass with the criss-cross pattern that appears in FIG. 6. If desired, strips of other metals such as brass, copper, aluminum or steel can also be used, similar to the described use of lead strips. Strips or die-cut patterns of other materials such as plastics, e.g., polypropylene, poly (vinyl chloride), etc., could also be adhesively bonded to the flat or planar surface of the panel.

The capability of the method of the invention permits an unlimited freedom of artistic relief patterns. An example of an artistic pattern is shown in FIG. 8, which is a planar view of a useful mold 46 having an artistic floral pattern 48. In FIG. 8, the mold is a metallic plate having sufficient thickness to provide recesses 50 of sufficient depth that the thermoplastic sheet material does not contact any mold surface when it sags into the recesses 50. Preferably, the recesses 50 are through apertures, thereby permitting reversal of the mold and production of pairs of light-transmitting panels with mirrored images of the artistic relief.

As illustrated, the mold 46 is defined by land segments 52 which are separated or interspaced with a plurality of through recesses 50. Each of the through recesses defines an artistic element such as petals 54 of a floral display as apparent from the periwinkle type flowers 56 or petals 58 of the tulip shaped flowers 60. Additionally, recesses 62 to define stems 64 and recesses 66 to define leaves 68 are provided in the mold 46. The land segments 52 between the recesses can be surface relieved by etching, grinding, etc., to provide a textured surface to the generally coplanar areas of thermoplastic sheet material which are compressed against the land segments 52 of the mold. Also, the land surfaces 52 could receive an adhesively bonded layer of plastic or metal, as described above with regard to FIG. 9.

Figure 10:
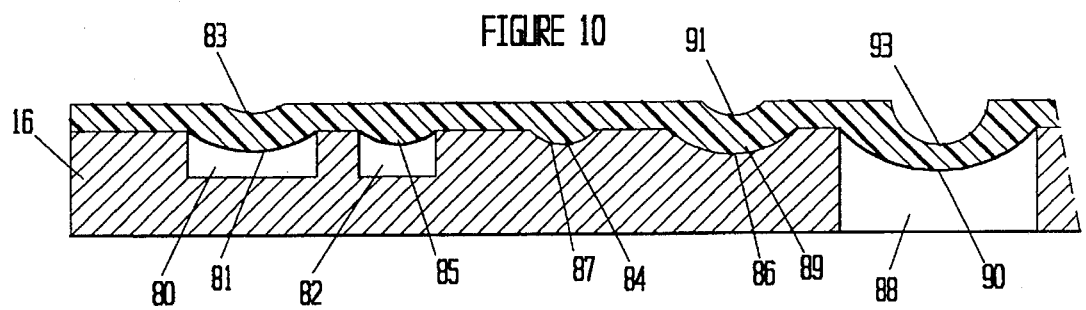
FIG. 10 is a sectional view of a mold and molded light-transmitting panel.

Various treatments can be used to fabricate the molds which are useful in the invention, and FIG. 10 is a sectional view of a mold having multiple recesses which were formed by different treatments. The mold includes recesses 80 and 82 which are formed by casting of the metal mold, or by machining techniques such as electrode discharge machining, milling, etc. More shallow recesses such as 84 and 86 can be formed either by casting of the mold 16, or by acid etching or grinding of the surface of the metal mold 16. The through cut outs such as 88 which have been previously described can also be formed by casting or machining of the metal mold. The protrusions 81, 85, 87 and 90 which are formed in the molded light-transmitting panel will all vary in depth, curvature and plate thickness, as illustrated.

Figure 11:
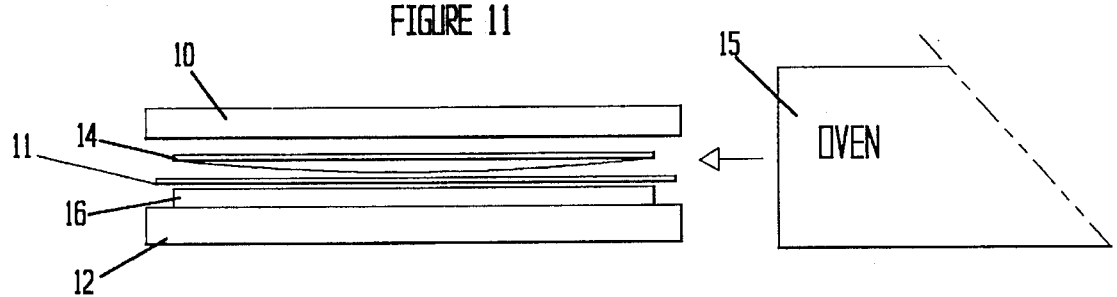
FIG. 11 is a view of an alternative molding method of the invention.

If desired, the molding of the light-transmitting panels can also be combined with coloring of panels by utilizing a thermoplastic colored overlay which can be placed between the mold and the thermoplastic sheet material in the manner illustrated in FIG. 11. In this fashion, a colored clear plastic film 11 can be placed between the mold 16 and the thermoplastic sheet 14. The film 11 can have a thickness from about 0.001 to about 0.1"can be combined with thermoplastic sheet material having thicknesses from about 0.1 to about 0.5". Alternatively or in addition, various metallic films such as aluminum film, anodized aluminum film, gold leaf, brass, copper, bronze, etc, an also be combined in the process by laying these films over the top surface of the mold 16 immediately preceding the application of the thermoplastic sheet material. In such applications, in which an opaque material such as metal film is used, it can be cut into a decorative pattern, e.g., corresponding to the criss-crossing ribs 42 of the mold 38 shown in FIG. 6, or the flat lands 52 of the mold 46 shown in FIG. 8. Even with light-transmitting colored plastic films, it may be desirable to cut the film into a decorative pattern to impart different colorations to the light-transmitting panel.

Alternatively, the light-transmitting panels obtained from the molds such as mold 46 could be frosted by sand blasting the flat or planar areas of the panel which are formed against the mold flat lands 52. In this treatment, the surface relieved areas can be covered with a protective layer of rubber, plastic, etc., which could be stripped from the panel after the sand blasting step.

In yet another treatment, an ink which contains selected colors or pigments, or other solvent applied coatings of colors or pigments can be applied to the land surfaces such as 52 of mold 46 prior to the molding step, by brushing, rolling, silk screen printing, spraying, etc. The ink or other solvent applied coating is selected to transfer to the panel during the molding step to produce a finished panel having its flat or planar surfaces coated with the color pigment. Suitable pigments can also include powdered metals such as powdered copper, brass, etc., as well as the more conventional metal oxide and organic pigments used in the printing and paint industries. If desired, opacifiers such as powdered clay, silica, etc., can also be used. A modification of this treatment would include the use of an opacifying material which would impart a frosted (colored or uncolored) appearance to the flat areas of the molded panel. An example of a suitable opacifying material can be a material having a reactivity to the thermoplastic, e.g., a solvent which can be applied to the mold surfaces directly or deposited on a suitable inert solid carrier, e.g., silica gel, diatomaceous earth, etc., which is applied as a coating on the selected mold surfaces.

The mold and method of the invention provide light-transmitting panels of remarkable refraction and reflection characteristics. Since the surface relief achieved by the method is not limited to the thickness of the sheet material used for fabrication of the panel, the finished light-transmitting panels have much greater light refraction and reflection characteristics than can be achieved by bevelling edges of plate material, such as commonly practiced with bevelled glass. Indeed, the increased thicknesses of the plastic material in the areas of the high curvature of the panel and the amount of this curvature achieves light refraction and reflection properties not attainable in any prior manufacture.

The molds used in the invention are also significantly lower in cost than molds in which the entire surface of the plastic contacts a mold surface. Since the plastic material never contacts a metallic mold surface in the smoothly contoured areas of the relief pattern of the panel, there is no necessity for polishing of mold surfaces to the high degree necessary to maintain optical quality to the plastic sheet material. Instead, the optical quality of the original plastic sheet is retained in the finished light-transmitting panel, resulting in a product of high optical quality.

As previously mentioned, molds having through recesses, i.e., open on both sides, can be reversed side-to-side to-side to prepare panels which have mirrored artistic images molded into their surfaces. This is desirable when the panels are displayed in a side-by-side array such as on adjacent doors or windows of a cabinet or building, and is achieved with only one mold rather than with a set of two, mirrored image molds.

The invention is applicable to plastic panels of many different thermoplastic resins. Useful of course are the optical quality thermoplastics such as polymethyl-methacrylate, polycarbonate, etc. The invention can also be applied to sheets of plastic resins which are transparent or translucent, e.g., colored resins.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A method for preparing decorative relief to light transmitting panels of thermoplastic material which comprises:

a. heating a sheet of said thermoplastic to a temperature above its softening temperature;

b. placing said sheet of thermoplastic on a mold having a plurality of relief-patterned lands, at least a pair of which are separated by a recess to receive a sag region of said thermoplastic with said recess having a depth greater than the sag of said sag region;

c. compressing said sheet against said lands at a pressure from 500 to 3000 psi., sufficient to impart surface relief texture to the land regions thereof resting on said relief-patterned lands and to cause extrusion of said plastic into said sag region and create non-uniformity in thickness of said panel by imparting a sheet thickness to sag region greater than the sheet thickness of the regions above said lands; and d. cooling said sheet and removing said sheet from said mold to obtain said light transmitting panel.

2. The method of claim 1 wherein said plurality of lands define an artistic pattern, segments of which border a plurality of recesses.

3. The method of claim 1 wherein said recess is a through aperture in said mold.

4. The method of claim 2 wherein said recesses are through apertures in said mold.

5. The method of claim 1 including the additional step of applying a film of colored plastic or metal between said mold and said sheet of thermoplastic to incorporate said film into said light-transmitting panel.

6. The method of claim 5 wherein said film is formed in a pattern coinciding with said lands of said mold.

7. The method of claim 4 including the step of turning said mold over after a first light-transmitting panel has been prepared having a first relief pattern, and repeating the molding step to prepare a second light-transmitting panel which has a second relief pattern that is the mirror image of said first relief pattern.

8. The light-transmitting panel produced by the method of claim 1.

9. A decorative, light-transmitting panel formed by thermoforming a light transmitting thermoplastic sheet having optical quality surfaces into a sheet having a relief pattern comprising a plurality of planar segments separated by entirely curvilinear convex surface relief areas on one side of said panel, and corresponding curvilinear concave surface relief areas on the opposite side of said panel, said areas also characterized by greater thicknesses than said planar segments and by smoothly arched, entirely curvilinear surfaces of greater optical quality than said planar segments.

10. The panel of claim 9 wherein said planar segments form a decorative pattern.

11. The panel of claim 9 wherein said planar segments have a surface relief pattern.

12. The panel of claim 9 including at least one film of colored plastic or metal overlying said planar segments.

* * * * *